United States Patent
Yang et al.

(10) Patent No.: US 9,478,007 B2
(45) Date of Patent: Oct. 25, 2016

(54) STABLE VIDEO SUPER-RESOLUTION BY EDGE STRENGTH OPTIMIZATION

(71) Applicant: Samsung Electronics Co., Ltd., Suwon-si, Gyeonggi-do (KR)

(72) Inventors: Bo Yang, Cerritos, CA (US); Li Tao, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/862,005

(22) Filed: Oct. 19, 2015

(65) Prior Publication Data
US 2016/0210727 A1    Jul. 21, 2016

Related U.S. Application Data

(60) Provisional application No. 62/106,030, filed on Jan. 21, 2015.

(51) Int. Cl.
G06T 3/40    (2006.01)
G06T 7/00    (2006.01)
G06K 9/46    (2006.01)
G06T 5/00    (2006.01)

(52) U.S. Cl.
CPC ............ G06T 3/403 (2013.01); G06K 9/4604 (2013.01); G06T 3/4053 (2013.01); G06T 5/003 (2013.01); G06T 7/0085 (2013.01); G06T 2207/10016 (2013.01); G06T 2207/20192 (2013.01)

(58) Field of Classification Search
None
See application file for complete search history.

(56) References Cited

U.S. PATENT DOCUMENTS

| | | | |
|---|---|---|---|
| 8,422,783 B2 | 4/2013 | Yuan et al. | |
| 8,538,201 B2 | 9/2013 | Damkat | |
| 8,538,203 B2 | 9/2013 | Pan | |
| 8,768,069 B2 | 7/2014 | Springer et al. | |
| 8,817,120 B2 | 8/2014 | Silverstein et al. | |
| 8,842,741 B2 | 9/2014 | Schoner et al. | |
| 8,872,946 B2 | 10/2014 | Cote et al. | |
| 8,917,336 B2 | 12/2014 | Cote et al. | |
| 2010/0086227 A1* | 4/2010 | Sun ........................ | G09G 5/391 382/254 |
| 2011/0043526 A1* | 2/2011 | Shiomi ..................... | G06T 3/40 345/428 |
| 2011/0057933 A1* | 3/2011 | Lyashevsky .............. | G06T 3/40 345/428 |
| 2011/0075026 A1* | 3/2011 | Wallace ................... | G06T 3/403 348/448 |
| 2013/0321671 A1 | 12/2013 | Cote et al. | |
| 2013/0321674 A1 | 12/2013 | Cote et al. | |
| 2013/0329098 A1 | 12/2013 | Lim et al. | |
| 2014/0177706 A1 | 6/2014 | Fernandes et al. | |
| 2014/0198992 A1* | 7/2014 | Popov ..................... | G06T 5/002 382/275 |
| 2015/0207978 A1* | 7/2015 | Tay ......................... | G02B 7/36 348/252 |

OTHER PUBLICATIONS

Sun, J. et al., "Gradient Profile Prior and Its Applications in Image Super-Resolution and Enhancement" Proceedings of the IEEE Transactions on Image Processing, Jun. 2011, pp. 1529-1542, vol. 20, No. 6, IEEE, United States.

* cited by examiner

*Primary Examiner* — Sean Motsinger
(74) *Attorney, Agent, or Firm* — Sherman IP LLP; Kenneth L. Sherman; Steven Laut

(57) ABSTRACT

A method includes determining, by a hardware processor and based on an image frame, a first edge strength distribution on a horizontal edge map and a second edge strength distribution on a vertical edge map. The first and second edge strength distributions are redistributed to narrow at least one of the first and second edge strength distributions. Non-texture regions of pixels are determined based on a data correlation map of the image frame. Edge strength magnitudes for the pixels of the non-texture regions of the horizontal edge map and the vertical edge map are determined. A high resolution frame is generated by adjusting intensity of respective pixels of the non-texture region of the horizontal edge map and the vertical edge map, the adjusting being based on neighboring pixels edge strength magnitudes.

30 Claims, 6 Drawing Sheets

400

410

Input: 1D magnitude vector $M_{i1} = \{m_1, \cdots, m_k\}$. Control factor $\alpha$.
$l = 1$, $y = k$, $m_p = \max\{m_1, \cdots, m_k\}$, change vector $C = \{c_1 = 0, \cdots, c_k = 0\}$.
while $l < y$
  if $m_l < m_y$
    $m'_l = \dfrac{\alpha \cdot m_l^2}{m_p}$; $g_a = \dfrac{(m_l - m'_l)}{y - l}$;
    for $t = l + 1$ to $y$
      $c_t = c_t + g_a$
    end
  else if $m_l > m_y$
    $m'_y = \dfrac{\alpha \cdot m_y^2}{m_p}$; $g_a = \dfrac{(m_y - m'_y)}{y - l}$
    for $t = l$ to $y - 1$
      $c_t = c_t + g_a$
    end
  else if $l + 1 < y$
    $m'_l = \dfrac{\alpha \cdot m_l^2}{m_p}$; $m'_y = \dfrac{\alpha \cdot m_y^2}{m_p}$; $g_a = \dfrac{(m_l - m'_l) + (m_y - m'_y)}{y - l - 1}$;
    for $t = l + 1$ to $y - 1$
      $c_t = c_t + g_a$
    end
  end
end
for $t = 1$ to $k$
  $m'_t = m_t + c_t$
end Output: 1D magnitude vector $M_0 = \{m'_1, \cdots, m'_k\}$.

STABLE VIDEO SUPER-RESOLUTION BY EDGE STRENGTH OPTIMIZATION

CROSS-REFERENCE TO RELATED APPLICATIONS

This application claims the priority benefit of U.S. Provisional Patent Application Ser. No. 62/106,030, filed Jan. 21, 2015, which is incorporated herein by reference in its entirety.

TECHNICAL FIELD

One or more embodiments relate generally to video displays, and in particular, to generating a high resolution image frame from an input image frame using edge enhancement and optimization.

BACKGROUND

In recent years, there has been improvement on television (TV) and other high-resolution display devices; for example, ultra-high definition TV (UDTV) or 4 K TV has been available on the market for a several years. The prosperity of high resolution content, however, does not catch up with the technology of display devices. There is demand of playing lower resolution content, e.g., 2 K video, on higher resolution devices, e.g., 4 K TV. There have been several challenges relating to playing 2 K video on 4 K TV devices. For example, generation of natural details, temporal consistency, sharpness preservation, noise reduction, real-time processing, etc.

SUMMARY

One or more embodiments relate to generating a high resolution image frame from an input image frame using edge enhancement and optimization. In one embodiment, a method includes determining, by a hardware processor and based on an image frame, a first edge strength distribution on a horizontal edge map and a second edge strength distribution on a vertical edge map. The first and second edge strength distributions are redistributed to narrow at least one of the first and second edge strength distributions. Non-texture regions of pixels are determined based on a data correlation map of the image frame. Edge strength magnitudes for the pixels of the non-texture regions of the horizontal edge map and the vertical edge map are determined. The edge strength magnitudes for the non-texture regions of the horizontal edge map and the vertical edge map are proportional to the strengths of the data correlation map. A high resolution frame is generated by adjusting intensity of respective pixels of the non-texture regions of the horizontal edge map and the vertical edge map, the adjusting being based on neighboring pixels edge strength magnitudes.

In one embodiment, an apparatus comprises a memory device configured to receive an image frame. A processor is configured to: extract a first edge strength distribution on a horizontal edge map and a second edge strength distribution on a vertical edge map from the image frame; redistribute the first and second edge strength distributions to narrow at least one of the first and second edge strength distributions; determine non-texture regions of pixels based on a data correlation map of the image frame; determine edge strength magnitudes for the pixels of the non-texture regions of the horizontal edge map and the vertical edge map, wherein the edge strength magnitudes for the non-texture regions of the horizontal edge map and the vertical edge map are proportional to the strengths of the data correlation map; and generate a high resolution frame by adjusting intensity of respective pixels of the non-texture region of the horizontal edge map and the vertical edge map, the adjusting being based on neighboring pixels edge strength magnitudes.

In one embodiment, a non-transitory processor-readable medium that includes a program that when executed by a processor performs a method. The method comprises determining, by a hardware processor and based on an image frame, a first edge strength distribution on a horizontal edge map and a second edge strength distribution on a vertical edge map. The first and second edge strength distributions are redistributed to narrow at least one of the first and second edge strength distributions. Non-texture regions of pixels are determined based on a data correlation map of the image frame. Edge strength magnitudes for the pixels of the non-texture regions of the horizontal edge map and the vertical edge map are determined. The edge strength magnitudes for the non-texture regions of the horizontal edge map and the vertical edge map are proportional to the strengths of the data correlation map. A high resolution frame is generated by adjusting intensity of respective pixels of the non-texture region of the horizontal edge map and the vertical edge map, the adjusting being based on neighboring pixels edge strength magnitudes.

These and other features, aspects and advantages of the one or more embodiments will become understood with reference to the following description, appended claims and accompanying figures.

BRIEF DESCRIPTION OF THE DRAWINGS

FIG. 4 shows an example of a gradient transform process, according to an embodiment;

DETAILED DESCRIPTION

Figure 1:
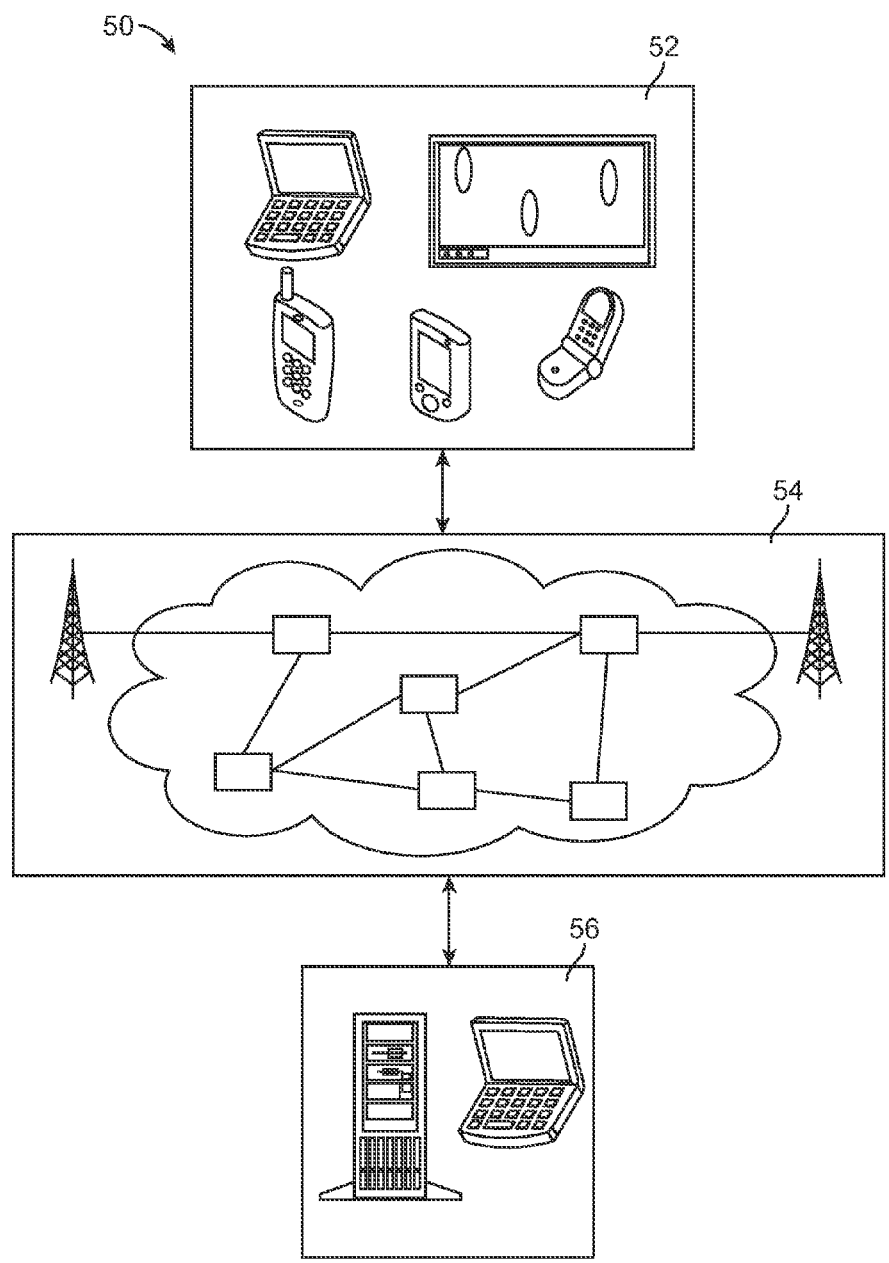
FIG. 1 shows an electronic system with an edge enhancement and optimization mechanism, according to one embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for generating a high resolution image frame from an input image frame using edge enhancement and optimization. In one embodiment, a method includes determining, by a hardware processor and based on an image frame, a first edge strength distribution on a horizontal edge map and a second edge strength distribution on a vertical edge map. The first and second edge strength distributions are redistributed to narrow at least one of the first and second edge strength distributions. Non-texture regions of pixels are determined based on a data correlation map of the image frame. Edge strength magnitudes for the pixels of the non-texture regions of the horizontal edge map and the vertical edge map are determined. The edge strength magnitudes for the non-texture regions of the horizontal edge map and the vertical edge map are proportional to the strengths of the data correlation map. A high resolution frame is generated by adjusting intensity of respective pixels of the non-texture region of the horizontal edge map and the vertical edge map, the adjusting being based on neighboring pixels edge strength magnitudes.

A person skilled in the art would appreciate that the format with which image information is expressed is not critical to some embodiments. For example, in some embodiments, image information is presented in the format of I(X, Y), where X and Y are two coordinates that define the location of a pixel in an image. Three-dimensional image information may presented by a format of I(X, Y, Z) with related information for color of the pixel, where X, Y, and Z are three coordinates that define the location of a pixel in an image. In one embodiment, the image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns.

FIG. 1 shows an electronic system 50 with an edge enhancement and optimization mechanism in one or more embodiments. The electronic system 50 includes a first device 52, such as a client or a server, connected to a second device 56, such as a client or server. The first device 52 may communicate with the second device 56 with a communication path 54, such as a wireless or wired network.

In one example, the first device 52 may be of any of a variety of ultra-high definition (UD) or 4 K display devices, such as a UD television (UDTV) or 4 K TV, tablet device, smart phone, personal digital assistant (PDA), a notebook computer, a liquid crystal display (LCD) system, a wearable device, mobile computing device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 56 may be a signal receiver for receiving broadcast or live stream signals, such as a television receiver, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

Figure 2:
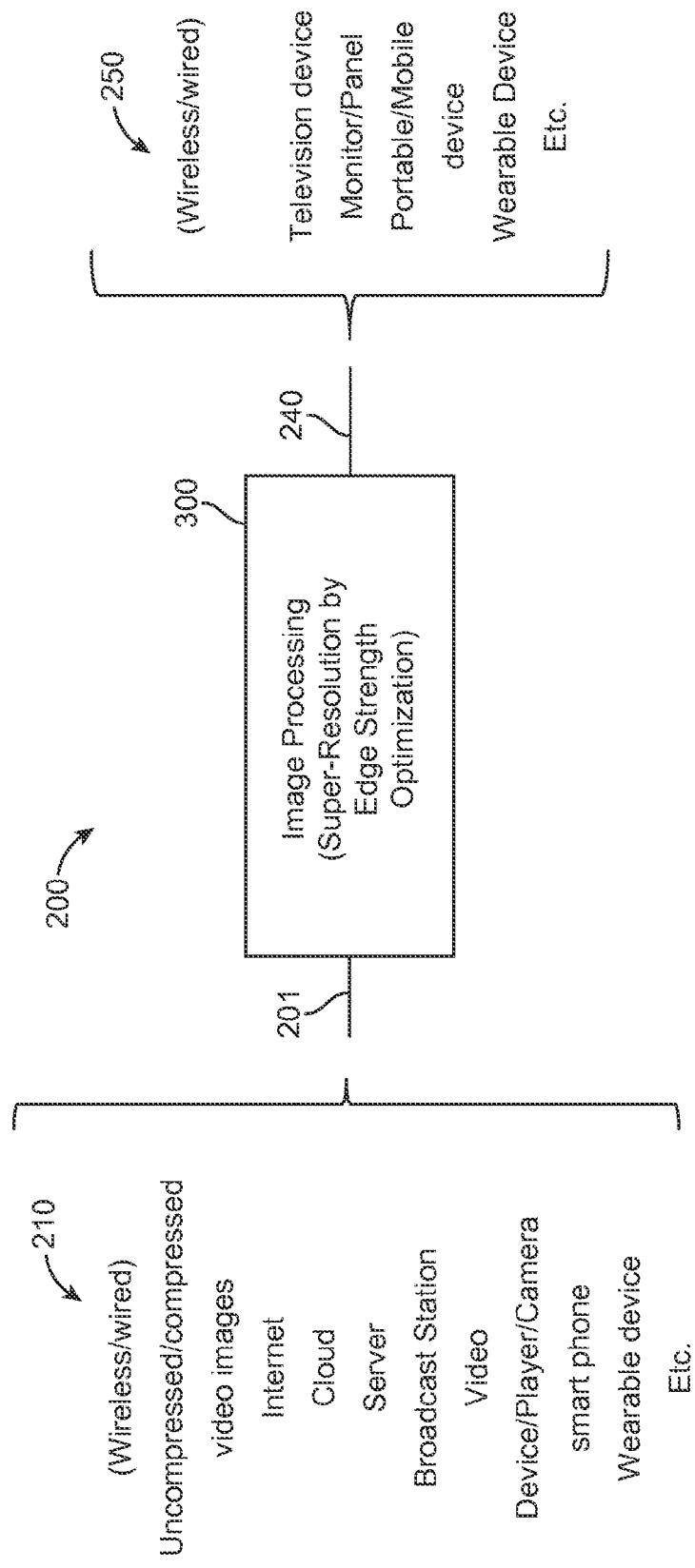
FIG. 2 shows an example high-level block diagram of a system, according to one embodiment.

FIG. 2 shows a high-level block diagram of a system 200, according to one embodiment. In one embodiment, the system 200 may process input video images from an input source 210 (or device 52 or 56, FIG. 1) received at an input node 201 (e.g., from the communication path 54, FIG. 1) using a super-resolution processor 300 (e.g., an integrated circuit (IC), hardware circuitry, a multi-core processor, an application specific IC (ASIC), CPU, etc.), output video images at the output node 240 (e.g., to the communication path 54) and display the images on an output source 250 (or device 52, FIG. 1). In one embodiment, the display for an output source 250 may be a physical device for presenting the image or multi-media presentations. For example, the display may be a screen, including a liquid crystal display (LCD) panel, a plasma screen, a projection screen, a heads-up-display (HUD), etc. In other embodiments, the display may be projected on an object or reflection device.

In one embodiment, the input video images may be provided from an input source 210, which may be transmitted/received wirelessly or through a wired interface (e.g., the communication path 54, FIG. 1) and may include uncompressed/compressed video content. In one embodiment, wireline or wireless communication of video imaging content in system 200 may include communication on/over one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1× enhanced voice-data only (EV-DO) or 1× EV-DO Gold Multicast) system, an IEEE 802.11 system, a DMB (Digital Multimedia Broadcasting) system, an orthogonal frequency division multiple access (OFDM) system, a DVB-H (Digital Video Broadcasting-Handheld) system, etc.

In one embodiment, the video input source 210 may be transmitted over a wireless network (e.g., Internet, local area network (LAN, wide-area network (WAN), personal area network (PAN), campus wireless network (CAN), metropolitan area network (MAN), etc., e.g., the communication path 54, FIG. 1). In one embodiment, the input source 210 may arise from a cloud-based system, a server, a broadcast station, a video device/player, a video camera, a mobile device, etc.

In one embodiment, the video image input from the input source may be decoded/encoded (e.g., via a decoder/encoder) prior to arriving at the input node 201. In one embodiment, the video image output from the output node 240 to an output source 250 may be encoded/decoded prior to arriving at the output node 240. In one embodiment, the output source 250 may receive the output image from the output node 240 wirelessly or through a wire interface.

In one embodiment, compressed video image content from an input source 210 may provide analog or digital video from a broadcast, computer network, a DVD or other computer readable storage medium, or any other suitable source of video signals. In one embodiment, the compressed video from an input source 210 may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source 210 may include one or more of a video camera, or a memory device such as a disk drive coupled to a receiver by any suitable video interface. In one embodiment, the uncompressed video from an input source 210 may provide uncompressed video in analog or digital form including in the form of luminance and chrominance, in individual color intensities such as red, green and blue, etc., or in any other suitable format.

In one embodiment, digital video formats for input video content from an input source 210 may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source 250. The display device of an output source 250 may be configured to receive NTSC, PAL, ATSC, DVB/T, etc.), or display device running at frame rates, such as 70 Hz, 75 Hz, 80 Hz, etc.

In one embodiment, a processor may perform the following. An input image frame is scaled by a factor of two (i.e., upscaled), and the edge strengths on the horizontal and vertical directions are extracted from the upscaled image frame. For each direction (horizontal and vertical), the Gaussian like edge magnitude distributions are found, i.e., increasing magnitudes followed by decreasing magnitudes. In one embodiment, each such distribution is considered as an edge, and the strengths are redistributed to make the distribution narrower while maintaining the sum of the distribution. A non-texture edge strength map is extracted using a 2D data correlation analysis. Based on the correlation map, the edge magnitudes are enhanced where no strong non-texture edge is nearby (e.g., within a distance of five pixels. The pixel intensities are adjusted according to the generated edge map. In one embodiment, the optimization is transformed into an energy minimization problem by maintaining the image content and the adjusted edge map. A fast iterative local difference optimization process is applied, such that pixel intensities move closer in values to the original input image frame 305 (FIG. 3) pixel intensities while the edge strengths move closer to the adjusted edge map edge strengths after each iteration.

The super-resolution processor 300 is described in greater detail later in connection with FIGS. 3-5.

Figure 3:
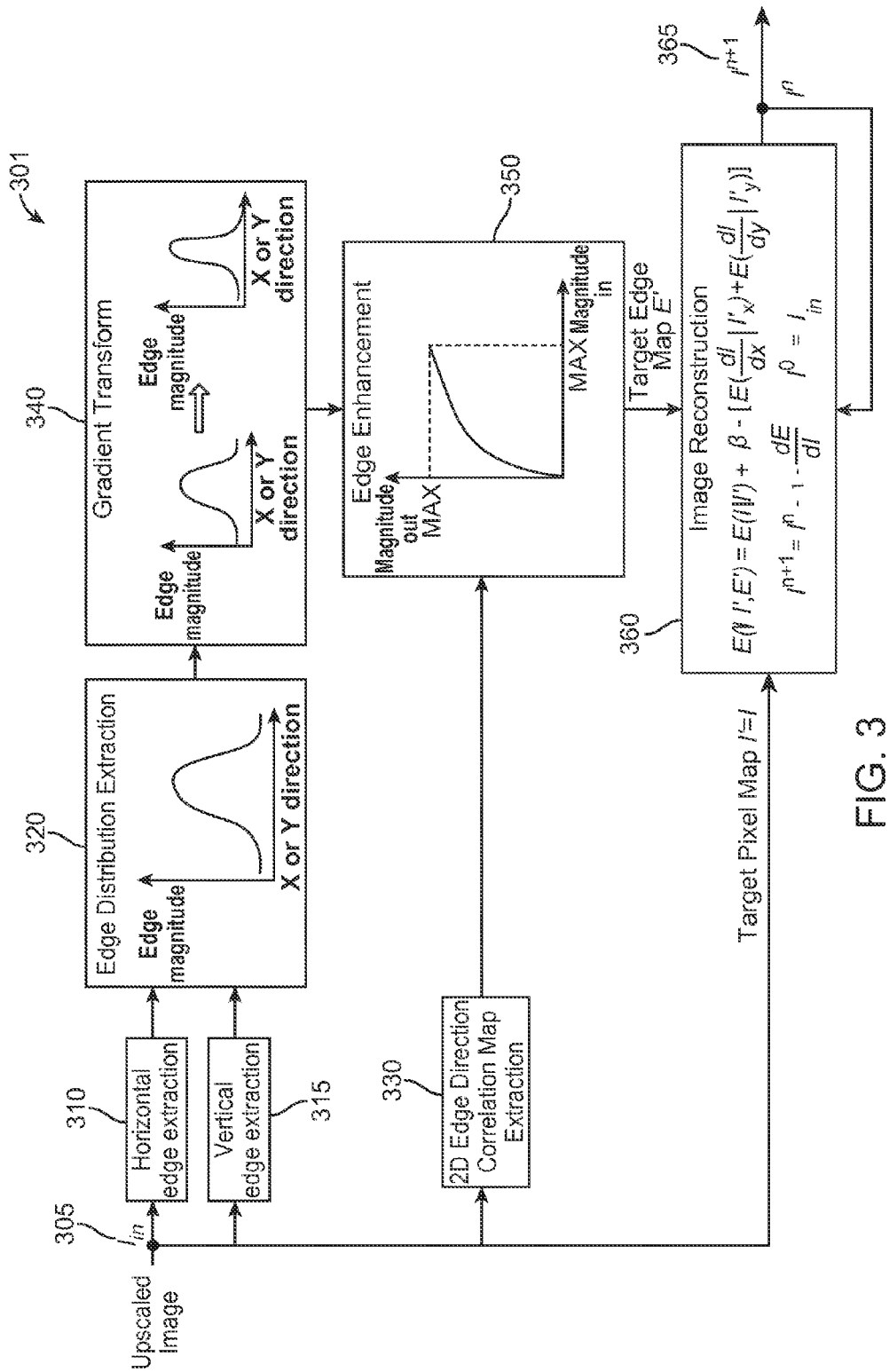
FIG. 3 shows a flowchart for a super-resolution processor, according to an embodiment.

FIG. 3 shows a flowchart 301 for the super-resolution processor(s) 300, according to an embodiment. In one embodiment, the processing blocks shown in flowchart 301 may be incorporated onto a microchip, integrated circuit (IC), multi-core processor(s), an application-specific IC(s) (ASIC(s)), CPU, etc. for incorporation into an electronic device, e.g., an electronic TV device, monitor, etc. For example, the flowchart 301 can be embodied by the super-resolution processor 300 of FIG. 2 as program instructions stored in a memory system coupled to one or more processors.

In one embodiment, the processing shown in flowchart 301 includes the following processing blocks: a horizontal edge extraction block 310, a vertical edge extraction block 315, an edge distribution extraction block 320, a 2D edge direction correlation map extraction block 330, a gradient transform block 340, an edge enhancement block 350, and an image reconstruction block 360. It should be noted that the processing blocks of FIG. 3 may each be a separate processing portion or processor on a microchip, multi-core processor, ASIC or IC, may be combined with other processing portions or processors, etc.

In one embodiment, the super-resolution output frame 365 of a video is generated frame by frame. Each given input image frame 305 is an upscaled image frame referred to as $I_{in}=I_{in}(x,y)$, where $x \in [1,W]$, $y \in [1,H]$, W is the width of the input image frame 305, and H is the height of the input image frame 305.

In one example, the input image frame 305 is an image frame that is scaled by a factor of two. Conventionally, UHD or 4 K devices have problems processing lower resolution video content. One or more embodiments improve display of lower resolution (e.g., 2 K) video content on UHD or 4 K devices by reducing edge magnitude values on two sides of an edge, and adding the reduced edge magnitude values to center magnitudes. Edge sharpening is separately applied in a horizontal direction and a vertical direction to reduce computational processing and to reduce required memory size. For example, the super-resolution processor 300 compares the resolution of the output display and the resolution of a digital video input. The super-resolution processor 300 determines the resolution of the output display by accessing display-resolution data stored in firmware of the video processing device (e.g., where the video processing device includes a display), or by querying the display device (e.g., where the video processing device and the display device are separate devices). The super-resolution processor 300 determines the resolution of the digital video by determining the height H and width W of a decompressed video frame or by accessing metadata linked to the digital video. In response to a determination that the resolution of the display is greater than the resolution of the digital video, the super-resolution processor 300 automatically upscales the digital video to the resolution of the display device. Furthermore, the super-resolution processor 300 processes the upscaled digital video in accordance with the flowchart 301 to improve the resolution of the upscaled digital video. In response to a determination that the resolution of the display is not greater than the resolution of the digital video, the super-resolution processor 300 omits upscaling and the operations of the flowchart 301.

Accordingly, the video processing device facilitates improving the display of digital video content on higher resolution electronic displays.

In one embodiment, in the horizontal edge extraction block 310 the horizontal edge map $E_h = \{E_h(x,y)\}$ is extracted. In the vertical edge extraction block 315 the vertical edge map $E_v = \{E_v(x,y)\}$ is extracted. In one embodiment, the horizontal and vertical edge maps are extracted into the following:

$$E_h(x,y) = I_{in}(x+1,y) - I_{in}(x,y)$$

$$E_v(x,y) = I_{in}(x,y+1) - I_{in}(x,y)$$

In one embodiment, in the edge distribution extraction block 320, for each edge map element $E_r(x,y)$ where $r \in \{h, v\}$, the edge map elements $E_r(x,y)$ are separated into the sign $S_r(x,y) \in \{1,-1\}$ and the magnitude $|E_r(x,y)|$, such that $E_r(x,y) = S_r(x,y)|E_r(x,y)|$. The edge distribution extraction block 320 then scans or searches the distributions to find any edge distribution that is a set of neighboring edge values: in the same row/column, with the same sign, and with the magnitude monotonically increasing and then monotonically decreasing. In one example, for the horizontal edge distribution extraction block 310, for a given row of the input image frame 305, the edge map is scanned in this row to find a set of continuous edge elements as $\{E_h(t,y), E_h(t+1,y), \ldots, E_h(t+p,y), E_h(t+p+1,y), \ldots, E(t+p+q,y)\}$ where $E_h(t+p,y)$ is the peak magnitude in the set, such that the following is satisfied:

$$S_h(a,y) = S_h(b,y) \forall t \leq a, b \leq t+p+q$$

$$|E_h(a,y)| \geq E_{min} \forall t \leq a, b \leq t+p+q$$

$$|E_h(a,y)| \leq |E_h(a+1,y)| \forall t \leq a \leq t+p-1$$

$$|E_h(a,y)| \geq |E_h(a+1,y)| \forall t+p \leq a \leq t+p+q-1$$

In one embodiment, once any such edge distribution is found according to the above equation set, the magnitude is extracted into a 1D vector as $M = \{m_1, \ldots, m_k\}$, k being a positive integer. In one embodiment, in the gradient transform block 340, the gradient transform is applied to ED using the gradient transform processing 400 (FIG. 4).

FIG. 4 shows an example of a gradient transform processing 400, according to an embodiment. As stated, the gradient transform processing 400 can correspond to an example embodiment of block 340 of FIG. 3. In one embodiment, the input 410 includes: 1D magnitude vector $M_{in} = \{m_1, \ldots, m_k\}$, control factor $\alpha$, $l=1$, $r=k$, $m_{peak} = \max\{m_1, \ldots, m_k\}$, and change vector $C = \{c_1=0, \ldots, c_k=0\}$. The output of the gradient transform 400 is a 1D magnitude vector $M_{out} = \{m_1, \ldots, m_k\}$.

In one embodiment, after the gradient transform processing 400 completes processing in the gradient transform block 340 resulting in edge magnitudes, the original edge signs are maintained and the new edge distribution is obtained. The gradient transform processing 400 reduces the edge magnitudes on two sides of the edge, and adds the reduced values to the center magnitudes. This processing scheme shrinks the edge width, which results in making the edge sharper. In one embodiment, after applying the gradient transform processing 400 to all horizontal and vertical edge distributions, new sharpened edge maps are obtained as: $E_r = \{E_r(x,y)\}$ where $r \in \{h,v\}$.

Returning to FIG. 3, in one embodiment, the edge enhancement block 350 enhances the edge strengths for pixels that are not located close to non-texture edges. The difference between texture and non-texture edges are measured by local edge directions: non-texture edges tend to have few principal directions while texture edges tend to have various directions. In one embodiment, a two-dimensional (2D) data correlation technique is used to obtain an edge correlation map $\{P(x,y)\}$, where $P(x,y)$ denotes the strength of the correlation of local edge directions; the larger $P(x,y)$ is, a pixel is more likely located on a non-texture edge. In one example, both correlation values and the edge magnitudes are normalized to the range [0, 1], and then the edge magnitude is enhanced by the following equation:

$$|E_r(x,y)| = |E_r(x,y)| \cdot (1 - (1 - P(x,y))^\rho) r \in \{h,v\}$$

where $\rho > 1$ is a control factor. This processing approach enhances all texture edges, such that the texture regions are boosted.

In one embodiment, after the enhanced edge map $E_r' = \{E_r'(x,y)\}$, $r \in \{h,v\}$, is obtained, a super-resolution image I is reconstructed by the image reconstruction block 360 by minimizing the following energy function:

$$E(I|I', E') = E(I|I') + \beta \cdot E\left(\frac{\partial I}{\partial x} \mid E_h'\right) + \beta \cdot E\left(\frac{\partial I}{\partial y} \mid E_v'\right)$$

$$= \sum_{x \in [1,W], y \in [1,H]} \left( E(I(x,y) \mid I'(x,y)) + \beta \cdot E\left(\frac{\partial I(x,y)}{\partial x} \mid E_h'(x,y)\right) + \beta \cdot E\left(\frac{\partial I(x,y)}{\partial y} \mid E_v'(x,y)\right) \right),$$

where I', E' are the target pixel intensity map and the target edge map, respectively, and $\beta$ is a weight factor. Such definition makes the constructed image I as close to the target image I' and the edge map of I as close to the target edge map E'. The target image I' is defined as the input image $I_{in}$, and the target edge map E' is defined as the two edge maps $E_h'$ and $E_v'$ generated from the processes discussed above. For a given pixel coordinate (x,y), the energy terms are defined as:

$$E(I(x, y) | I'(x, y)) = (I(x, y) - I'(x, y))^2$$

$$E\left(\frac{\partial I(x, y)}{\partial x} \bigg| E_h'(x, y)\right) = (I(x + 1, y) - I(x, y) - E_h'(x, y))^2$$

$$E\left(\frac{\partial I(x, y)}{\partial y} \bigg| E_v'(x, y)\right) = (I(x, y + 1) - I(x, y) - E_v'(x, y))^2.$$

In one embodiment, the image reconstruction block 360 optimizes the energy function by using a gradient descent iterative process. After computation processing, the gradient on a pixel intensity I(x,y) is $$\frac{1}{2}\frac{\partial E}{\partial I(x, y)} =$$
$$(I(x, y) - I'(x, y)) + \beta(4I(x, y) - I(x, y - 1) - I(x - 1, y) - I(x + 1, y) -$$
$$I(x, y + 1) - E_v'(x, y - 1) - E_h'(x - 1, y) + E_h'(x, y) + E_v'(x, y)).$$

In one embodiment, the iterative process is performed as $$I^{n+1}(x, y) = I^n(x, y) - \tau \cdot \frac{\partial E}{\partial I(x, y)},$$

where τ is a step factor. In one example, two rounds of iterations produce good super-resolution results for the super-resolution output frame 365. As the iterations only require neighboring two rows of pixels, the processing may be implemented in a non-iterative way by maintaining a buffer for storage of temporary values for related rows. In one embodiment, the super-resolution output frame 365 is received by or transmitted to an output source (e.g., device 52, FIG. 1, or output source 250, FIG. 2) wirelessly or through a wire interface (e.g., via communication path 54) and displayed on a display device (e.g., a TV device or monitor).

Figure 5:
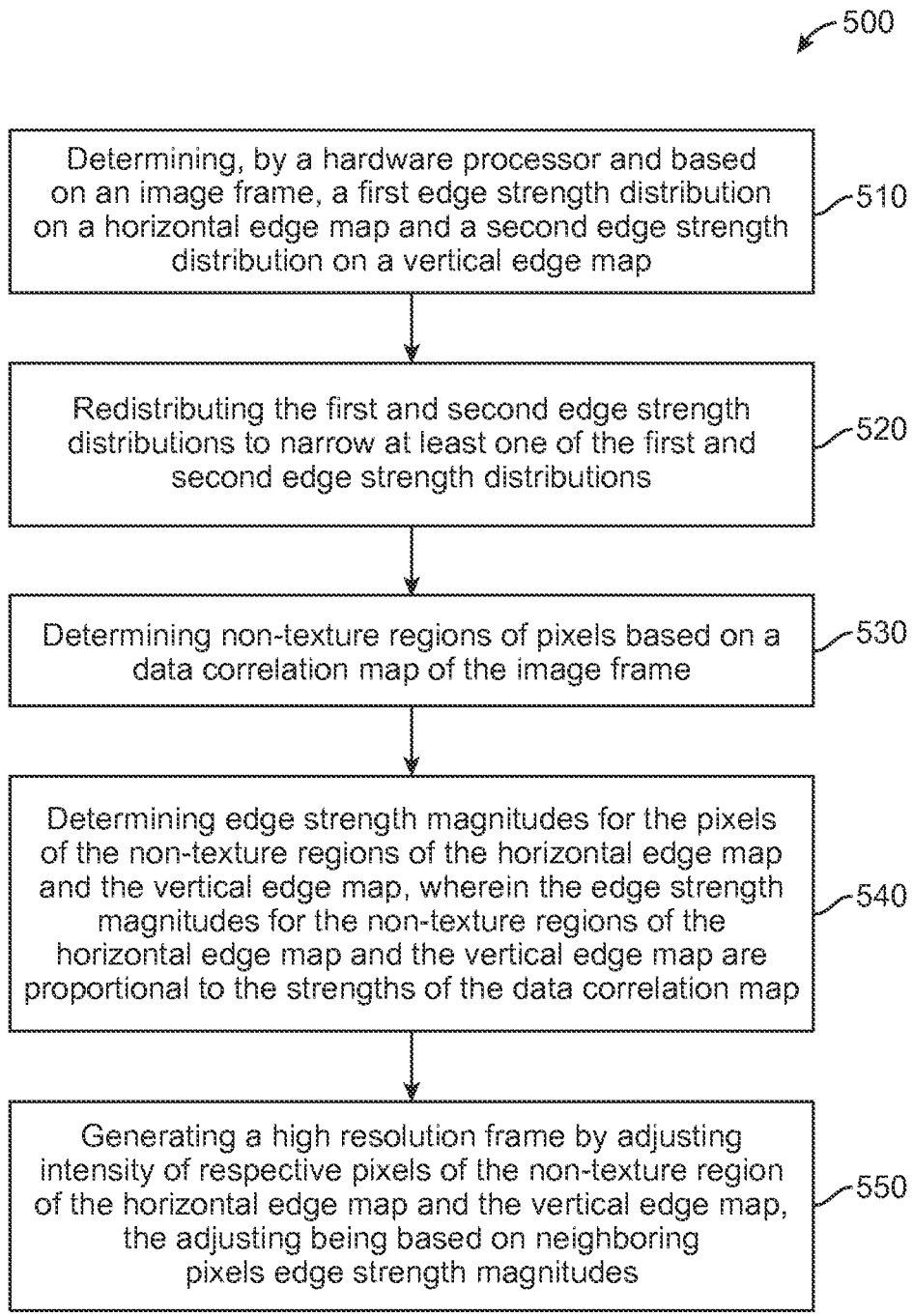
FIG. 5 shows an example flow diagram for generating a super-resolution image frame from an input image frame using edge enhancement and optimization, according to an embodiment.

FIG. 5 shows an example flow diagram of a process 500 that generates a super-resolution image frame from an (upscaled) input image frame by edge enhancement and optimization, according to an embodiment. In one embodiment, in block 510 a hardware processor (e.g., super-resolution processor 300, FIG. 2) determines, based on an image frame (e.g., input image frame 305, FIG. 3), a first edge strength distribution on a horizontal edge map and a second edge strength distribution on a vertical edge map (e.g., processing in the edge distribution extraction block 320, FIG. 3). In one embodiment, in block 520 process 500 redistributes the first and second edge strength distributions to narrow at least one of the first and second edge strength distributions (e.g., processing in the gradient transform block 340, FIG. 3, and gradient transform processing 400, FIG. 4). In block 530 process 500 determines non-texture regions of pixels based on a data correlation map of the image frame (e.g., processing in the 2D edge direction correlation map extraction block 330, FIG. 3). In block 540 process 500 determines edge strength magnitudes for the pixels of the non-texture regions of the horizontal edge map and the vertical edge map (e.g., processing in the image reconstruction block 360, FIG. 3). In one embodiment, the edge strength magnitudes for the non-texture region of the horizontal edge map and the vertical edge map are proportional to the strengths of the data correlation map. In block 550 process 500 generates a high resolution (e.g., super-resolution) frame by adjusting intensity of respective pixels of the non-texture region of the horizontal edge map and the vertical edge map (e.g., processing in the edge enhancement block 350, FIG. 3). In one example, process 500 makes the adjustments based on neighboring pixels edge strength magnitudes.

In one embodiment, redistributing the first and second edge strength distributions includes maintaining a sum of the respective first and second edge strength distributions (e.g., processing in the gradient transform block 340, FIG. 3, and gradient transform processing 400, FIG. 4). Process 500 may further include processing that determines non-texture regions of pixels based on an edge data correlation map of pixels of the image frame (e.g., processing in the 2D edge direction correlation map extraction block 330, FIG. 3). The edge data correlation map includes strength of a correlation of local pixel edge directions.

In one embodiment, process 500 may include processing that extracts the horizontal edge map (e.g., processing in the horizontal edge extraction block 310, FIG. 3) and the vertical edge map from the image frame, (e.g., processing in the vertical edge extraction block 315, FIG. 3). In one embodiment, for each distribution of the first and second edge strength distributions: each pixel has a same sign of edge strength; each pixel has a magnitude of strength larger than a threshold; and an overall magnitude of each distribution increases monotonically to a peak value and then decreases monotonically.

In one embodiment, for at least two processing iterations of adjusting intensity of respective pixels, pixel intensities are processed and move closer to pixel intensities of the image frame while the edge strengths move closer to edge strengths of the adjusted horizontal and vertical edge maps. Process 500 may include processing that separates each horizontal and vertical edge map element into an edge pixel sign {1, −1} and edge magnitude (e.g., processing in the edge distribution extraction block 320, FIG. 3). In one embodiment, the first edge distribution and the second edge distribution each include a set of neighboring edge values in a same pixel row or pixel column with a same edge pixel sign and with an edge magnitude that monotonically increases and then monotonically decreases.

In one embodiment, process 500 may include processing that reduces edge magnitude values on two sides of an edge, and adds the reduced edge magnitude values to center magnitudes (e.g., processing in the gradient transform block 340, FIG. 3, and gradient transform processing 400, FIG. 4). In one embodiment, process 500 separately applies edge sharpening in a horizontal direction and a vertical direction to reduce computational processing and to reduce required memory size.

Figure 6:
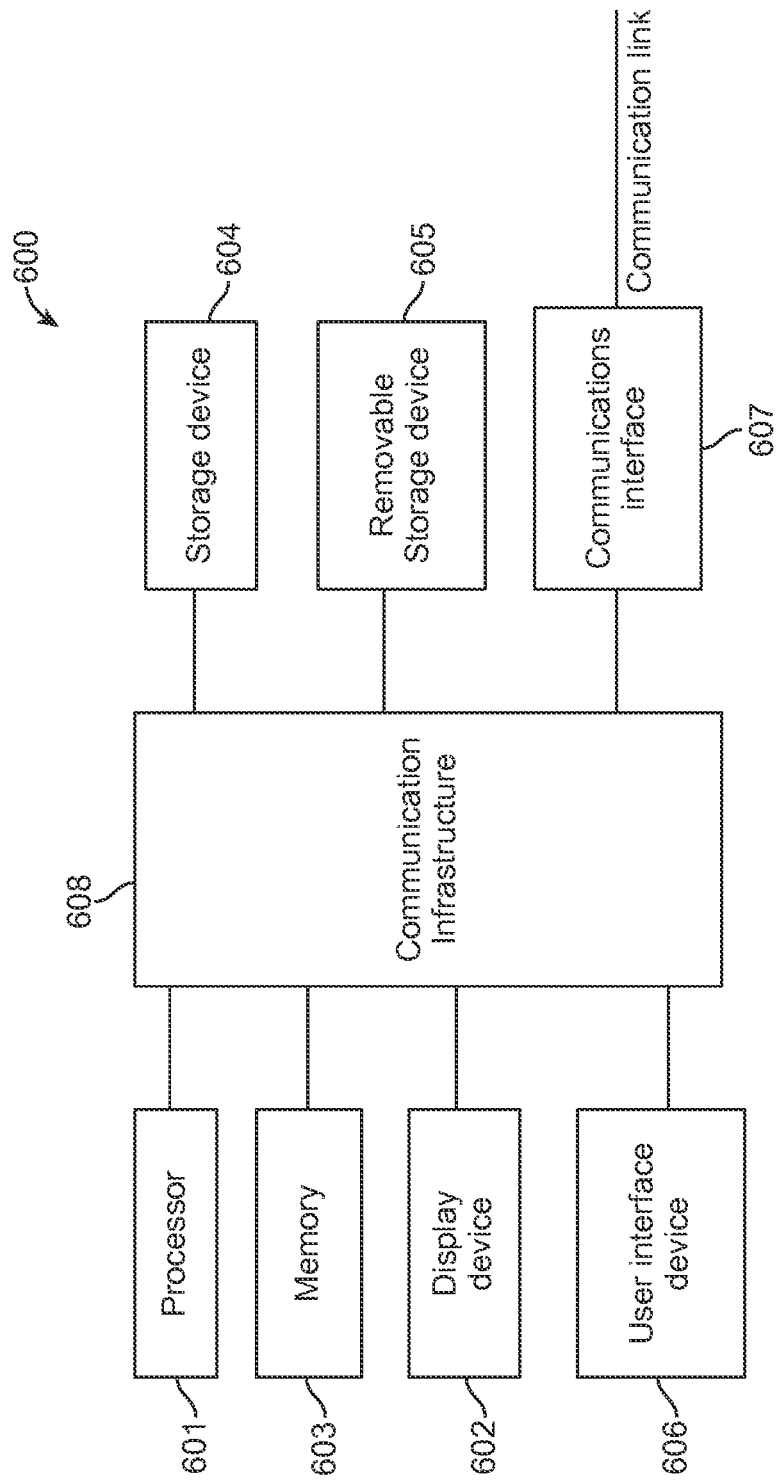
FIG. 6 is an exemplary high-level block diagram showing an information processing system comprising a computer system useful for implementing disclosed embodiments.

FIG. 6 is a high-level block diagram showing an information processing system comprising a computer system 600 useful for implementing the disclosed embodiments. Computer system 600 may be incorporated in a device 52, 56, FIG. 1, or devices 210 or 250, FIG. 2). The computer system 600 includes one or more processors 601 (e.g., processor(s) 300, FIG. 2), and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices (e.g., over communication path 54, FIG. 1). The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for flowchart 301 (FIG. 3) and processing instructions for process 500 (FIG. 5) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   determining, by a hardware processor and based on an image frame, a first edge strength distribution on a horizontal edge map and a second edge strength distribution on a vertical edge map;
   redistributing the first and second edge strength distributions to narrow at least one of the first and second edge strength distributions;
   determining non-texture regions of pixels based on a data correlation map of the image frame;
   determining edge strength magnitudes for the pixels of the non-texture regions of the horizontal edge map and the vertical edge map, wherein the edge strength magnitudes for the non-texture regions of the horizontal edge map and the vertical edge map are proportional to the strengths of the data correlation map; and
   generating a high resolution frame by adjusting intensity of respective pixels of the non-texture region of the horizontal edge map and the vertical edge map, the adjusting being based on neighboring pixels edge strength magnitudes.

2. The method of claim 1, wherein the image frame is an upscaled image frame.

3. The method of claim 2, wherein redistributing the first and second edge strength distributions further comprises maintaining a sum of the respective first and second edge strength distributions.

4. The method of claim 3, further comprising:
   determining non-texture regions of pixels based on an edge data correlation map of pixels of the image frame, wherein the edge data correlation map comprises strength of a correlation of local pixel edge directions.

5. The method of claim 2, further comprising:
   extracting the horizontal edge map and the vertical edge map from the image frame.

6. The method of claim 2, wherein for each distribution of the first and second edge strength distributions:
   each pixel has a same sign of edge strength;
   each pixel has a magnitude of strength larger than a threshold; and
   an overall magnitude of each distribution increases monotonically to a peak value and then decreases monotonically.

7. The method of claim 6, wherein for at least two iterations of adjusting intensity of respective pixels, pixel intensities move closer to pixel intensities of the image frame while the edge strengths move closer to edge strengths of the adjusted horizontal and vertical edge maps.

8. The method of claim 1, further comprising:
   separating each horizontal and vertical edge map element into an edge pixel sign {1,−1} and edge magnitude, wherein the first edge distribution and the second edge distribution each comprise a set of neighboring edge values in a same pixel row or pixel column with a same edge pixel sign and with an edge magnitude that monotonically increases and then monotonically decreases.

9. The method of claim 8, further comprising:
   reducing edge magnitude values on two sides of an edge; and adding the reduced edge magnitude values to center magnitudes.

10. The method of claim 1, wherein edge sharpening is separately applied in a horizontal direction and a vertical direction to reduce computational processing and to reduce required memory size.

11. An apparatus comprising:
a memory device configured to receive an image frame; and
a processor configured to:
extract a first edge strength distribution on a horizontal edge map and a second edge strength distribution on a vertical edge map from the image frame;
redistribute the first and second edge strength distributions to narrow at least one of the first and second edge strength distributions;
determine non-texture regions of pixels based on a data correlation map of the image frame;
determine edge strength magnitudes for the pixels of the non-texture regions of the horizontal edge map and the vertical edge map, wherein the edge strength magnitudes for the non-texture regions of the horizontal edge map and the vertical edge map are proportional to the strengths of the data correlation map; and
generate a high resolution frame by adjusting intensity of respective pixels of the non-texture region of the horizontal edge map and the vertical edge map, the adjusting being based on neighboring pixels edge strength magnitudes.

12. The apparatus of claim 11, wherein the image frame is an upscaled image frame.

13. The apparatus of claim 12, wherein the processor is configured to redistribute the first and second edge strength distributions based on maintaining a sum of the respective first and second edge strength distributions.

14. The apparatus of claim 13, wherein the processor is further configured to determine non-texture regions of pixels based on an edge data correlation map of pixels of the image frame, and the edge data correlation map comprises strength of a correlation of local pixel edge directions.

15. The apparatus of claim 12, wherein for each distribution of the first and second edge strength distributions:
each pixel has a same sign of edge strength;
each pixel has a magnitude of strength larger than a threshold; and
an overall magnitude of each distribution increases monotonically to a peak value and then decreases monotonically.

16. The apparatus of claim 15, wherein the processor is configured to perform at least two iterations to adjust intensity of respective pixels, and for the at least two iterations pixel intensities move closer to pixel intensities of the image frame while the edge strengths move closer to edge strengths of the adjusted horizontal and vertical edge maps.

17. The apparatus of claim 11, wherein the processor is configured to:
separate each horizontal and vertical edge map element into an edge pixel sign {1,−1} and edge magnitude, and the first edge distribution and the second edge distribution each comprise a set of neighboring edge values in a same pixel row or pixel column with a same edge pixel sign and with an edge magnitude that monotonically increases and then monotonically decreases.

18. The apparatus of claim 17, wherein the processor is configured to:
reduce edge magnitude values on two sides of an edge; and
add the reduced edge magnitude values to center magnitudes.

19. The apparatus of claim 11, wherein the processor is configured to separately apply edge sharpening in a horizontal direction and a vertical direction to reduce computational processing and to reduce memory storage for the memory device.

20. The apparatus of claim 11, wherein the processor is embedded in a microchip of an electronic television device.

21. A non-transitory processor-readable medium that includes a program that when executed by a processor performs a method comprising:
determining, by a hardware processor and based on an image frame, a first edge strength distribution on a horizontal edge map and a second edge strength distribution on a vertical edge map;
redistributing the first and second edge strength distributions to narrow at least one of the first and second edge strength distributions;
determining non-texture regions of pixels based on a data correlation map of the image frame;
determining edge strength magnitudes for the pixels of the non-texture regions of the horizontal edge map and the vertical edge map, wherein the edge strength magnitudes for the non-texture regions of the horizontal edge map and the vertical edge map are proportional to the strengths of the data correlation map; and
generating a high resolution frame by adjusting intensity of respective pixels of the non-texture region of the horizontal edge map and the vertical edge map, the adjusting being based on neighboring pixels edge strength magnitudes.

22. The non-transitory processor-readable medium of claim 21, wherein the image frame is an upscaled image frame.

23. The non-transitory processor-readable medium of claim 22, wherein redistributing the first and second edge strength distributions further comprises maintaining a sum of the respective first and second edge strength distributions.

24. The non-transitory processor-readable medium of claim 23, further comprising:
determining non-texture regions of pixels based on an edge data correlation map of pixels of the image frame, wherein the edge data correlation map comprises strength of a correlation of local pixel edge directions.

25. The non-transitory processor-readable medium of claim 22, further comprising:
extracting the horizontal edge map and the vertical edge map from the image frame.

26. The non-transitory processor-readable medium of claim 22, wherein for each distribution of the first and second edge strength distributions:
each pixel has a same sign of edge strength;
each pixel has a magnitude of strength larger than a threshold; and
an overall magnitude of each distribution increases monotonically to a peak value and then decreases monotonically.

27. The non-transitory processor-readable medium of claim 26, wherein for at least two iterations of adjusting intensity of respective pixels, pixel intensities move closer to pixel intensities of the image frame while the edge strengths move closer to edge strengths of the adjusted horizontal and vertical edge maps.

28. The non-transitory processor-readable medium of claim 21, further comprising:

separating each horizontal and vertical edge map element into an edge pixel sign {1,−1} and edge magnitude, wherein the first edge distribution and the second edge distribution each comprise a set of neighboring edge values in a same pixel row or pixel column with a same edge pixel sign and with an edge magnitude that monotonically increases and then monotonically decreases.

29. The non-transitory processor-readable medium of claim 28, further comprising:

reducing edge magnitude values on two sides of an edge; and adding the reduced edge magnitude values to center magnitudes.

30. The non-transitory processor-readable medium of claim 21, wherein edge sharpening is separately applied in a horizontal direction and a vertical direction to reduce computational processing and to reduce required memory size.

\* \* \* \* \*